UNITED STATES PATENT OFFICE.

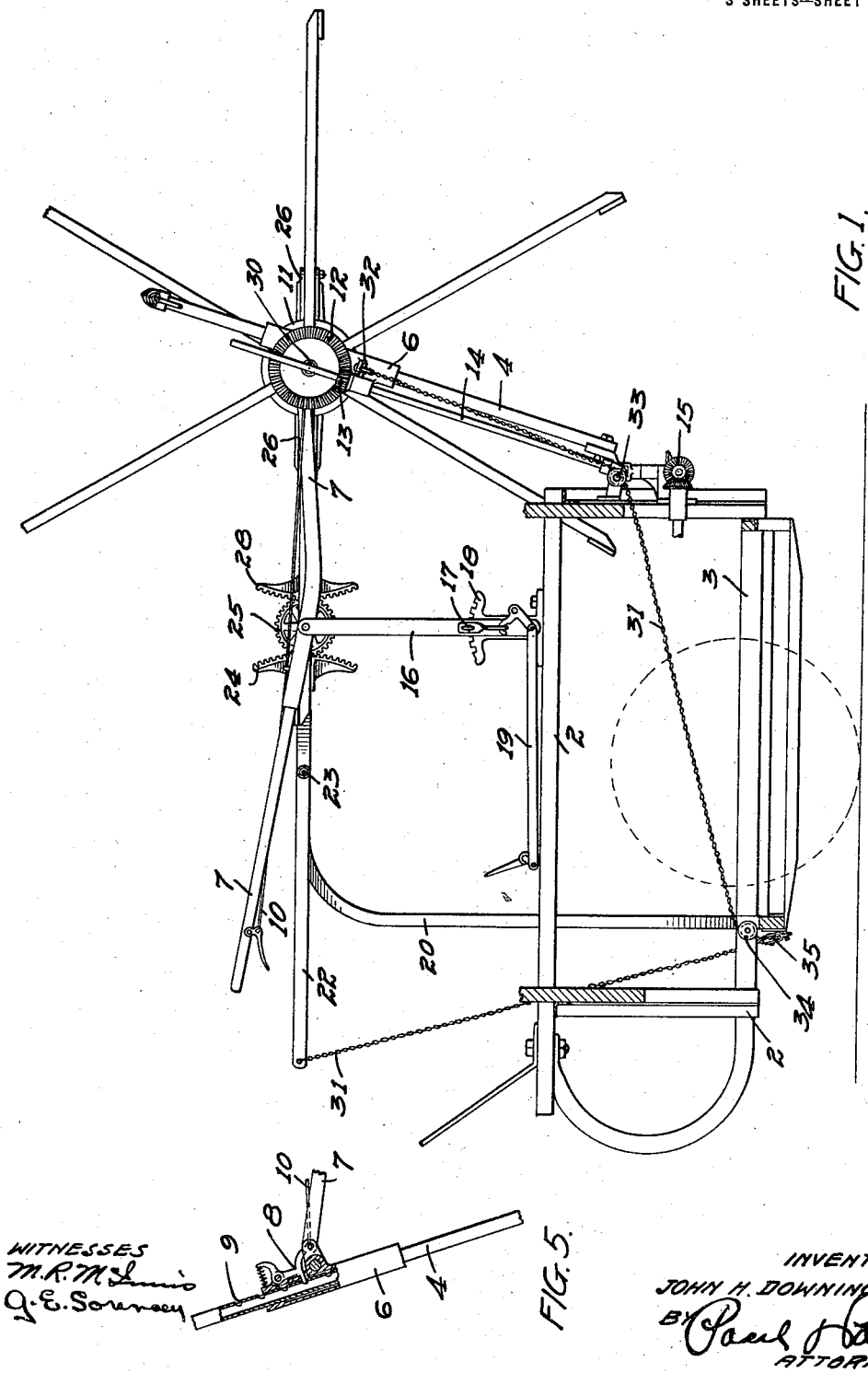

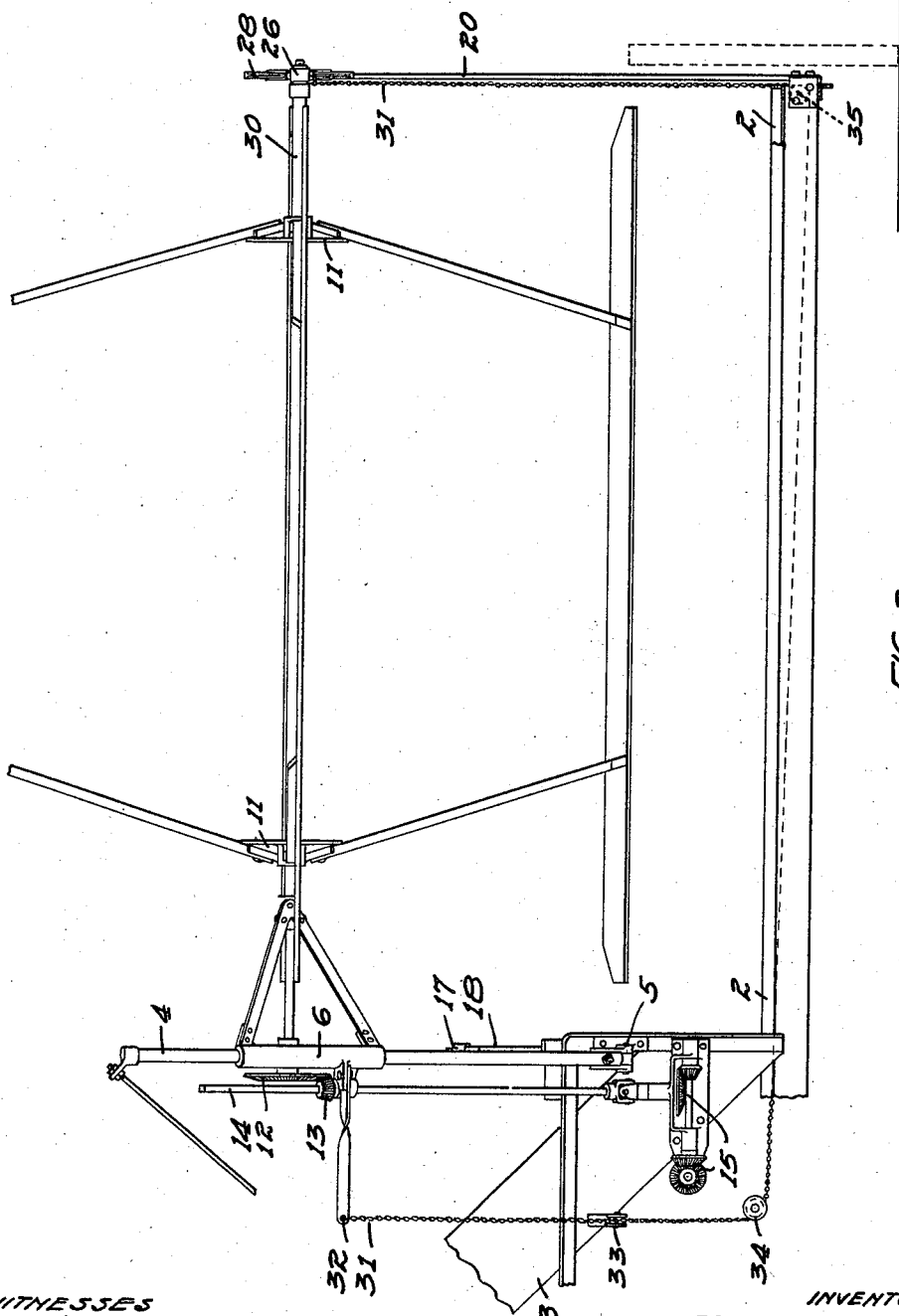

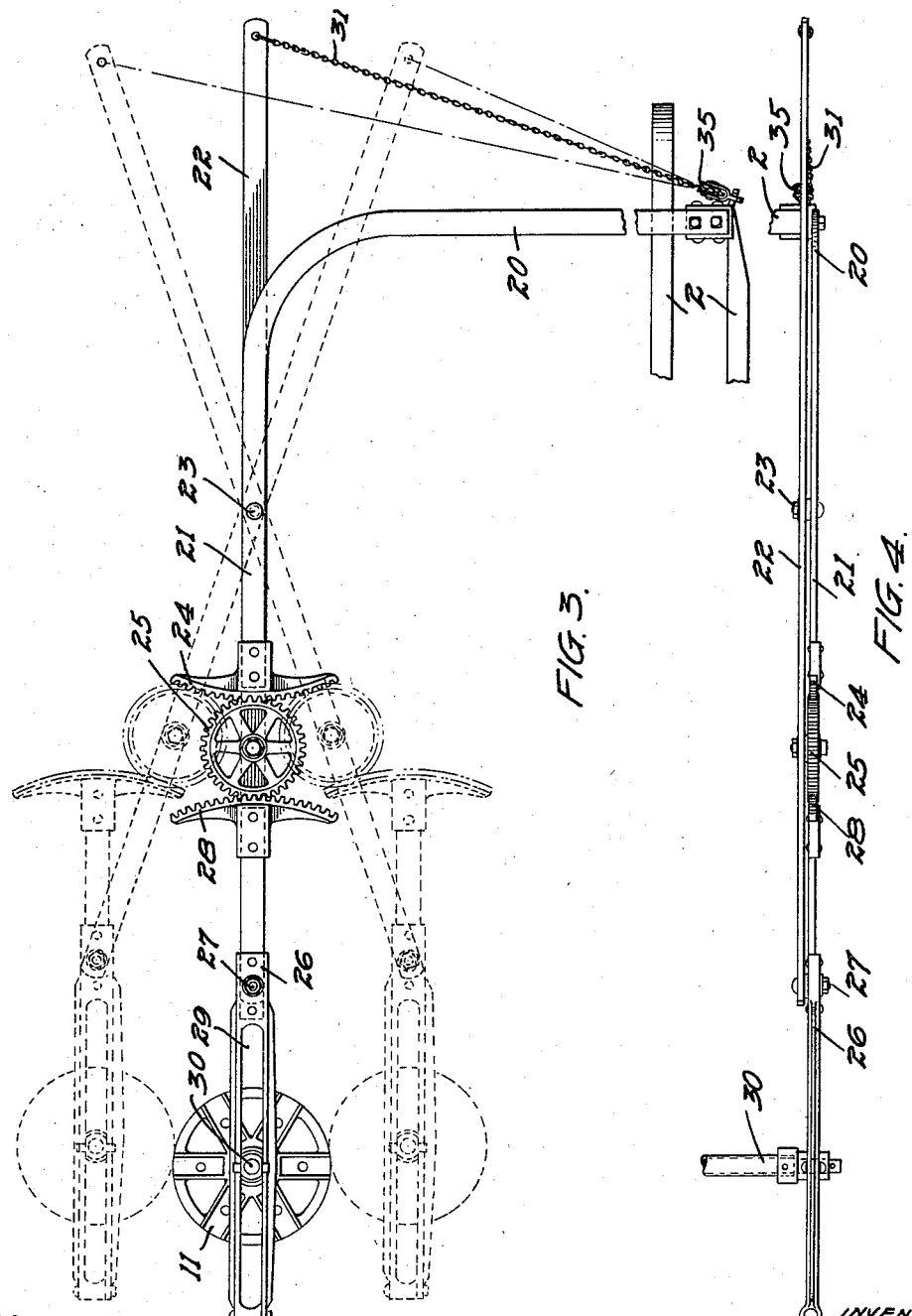

JOHN H. DOWNING, OF MINNEAPOLIS, MINNESOTA, ASSIGNOR TO STATE OF MINNESOTA.

REEL-SUPPORT.

1,179,707.  Specification of Letters Patent.  Patented Apr. 18, 1916.

Application filed May 25, 1915. Serial No. 30,336.

*To all whom it may concern:*

Be it known that I, JOHN H. DOWNING, subject of the King of Great Britain, resident of Minneapolis, county of Hennepin, State of Minnesota, have invented certain new and useful Improvements in Reel-Supports, of which the following is a specification.

My invention relates to supports for the outer or grainward end of a harvester reel and the object of the invention is to provide means for carrying the outer end of the reel which will allow it to be moved freely fore and aft or in a vertical direction from the opposite or stubbleward end of the reel.

A further object is to provide a support which will be comparatively simple in construction and readily applied to the ordinary type of harvester.

The invention consists generally in various constructions and combinations, all as hereinafter described and particularly pointed out in the claims.

In the accompanying drawings forming part of this specification, Figure 1 is a sectional view through the machine, looking toward the grainward side, Fig. 2 is a front elevation of the grain deck and reel and the reel operating mechanism, Fig. 3 is a side elevation of the mechanism for supporting the reel at the grainward side of the machine, the different positions being illustrated in dotted lines, Fig. 4 is a plan view of the same, Fig. 5 is a detail view showing the mechanism for adjusting the stubbleward end of the reel.

In the drawing, 2 represents the frame of the machine, having at the stubbleward end of the deck 3 a rod 4 pivotally supported at 5 and provided with a sliding sleeve 6. A lever 7 is pivotally connected to said sleeve and a locking latch 8 is carried by said sleeve to engage notches 9 in the rod 4. The lever 7 has a trip 10 connected with the latch 8. The reel head 11 has a beveled gear 12 meshing with a pinion 13 that is slidable on a shaft 14 and is driven through a gearing 15 to revolve the reel. The lever 7 is pivoted on the upper end of a rocking standard 16 mounted on the frame 2 and having a locking latch 17 to engage the teeth of a quadrant 18. A trip device 19 is connected with said locking latch. When this latch is released, the operator may move the standard 16 back and forth by pressure on the lever 7 and by depressing the said lever he can raise or lower the sleeve 6 to elevate or depress the reel. This is ordinary construction in devices of this kind and I make no claim to the same herein.

At the opposite or grainward end of the deck and near the rear thereof I provide an upright standard 20 having a forwardly projecting horizontal portion 21. To this forwardly projecting portion a lever 22 is pivoted at 23. In front of this pivot on the part 21 a curved rack 24 is secured. The lever 22 may be adjusted in alinement with this horizontal portion 21 and carries a gear wheel 25 mounted to mesh with the teeth of the rack 24. On the forward end of the lever 22 is an arm 26 pivoted at 27 and having a curved rack 28 corresponding to the rack 24 and opposite and opposing the same and meshing with the teeth of the gear 25 on the opposite side thereof from the rack 24.

An arm 26 has a longitudinal slot 29 therein and in this slot the reel shaft 30 is mounted to slide when movement is imparted to the reel through the lever 7 or the rocking standard 6 at the opposite or stubbleward end of the deck. The vertical movement of the reel is transmitted from one end to the other thereof through a flexible connection 31 that is attached at 32 to the sleeve 6 and has running connections with sheaves 33, 34 and 35 on the machine frame and extends to the rear or free end of the lever 22. When, therefore, the lever 7 is tilted to raise the stubbleward end of the reel and the sleeve 6 a corresponding movement will simultaneously be transmitted through the flexible connection 31 to the lever 22 to oscillate it and raise the reel. Downward movement of the reel will, of course, be effected by gravity when the sleeve supporting the stubbleward end of the reel is released.

It will be noted by an examination of Fig. 3 that the arm 26 is always in a substantially horizontal position, regardless of the tilting movement of the lever 22. If the rear end of the lever 22 is depressed to lift the forward end thereof, the gear wheel carried by this lever and the arm 26 also mounted on the lever will be elevated and the gear wheel engaging the stationary rack 24 will be revolved and will roll on the teeth of the rack 28, moving this rack and its supporting arm a sufficient distance on the pivot 27 to maintain the arm horizontal so that the reel shaft in the slot 29 will have no tendency to slide prematurely either forward or backward but will be held in a stationary position until such time as the mechanism at the other end of the reel is operated, and when adjustment of this mechanism does take place, the grainward end of the reel shaft will slide freely in the slot 29 until the desired fore and aft adjustment is obtained. If the lever 22 is allowed to tilt upward and the forward end thereof to drop below the standard 21, the gear wheel will roll in the opposite direction on the rack 28 and allow the arm 26 to still maintain its horizontal position so that, regardless of the angle to which the lever 22 may be tilted, the reel-supporting arm 26 will always be horizontal.

The mechanism above described will form a substantial support for the grainward end of the reel, raising and lowering it as the stubbleward end is raised or lowered and at the same time permitting freedom of fore and aft movement of the reel as conditions may require.

I claim as my invention:

1. The combination, with a harvester deck, of a reel shaft, a support for the stubbleward end of said shaft, means for adjusting said support to shift said reel, a standard mounted at the grainward end of said deck, a lever pivoted on said standard and connected with said reel shaft support for movement therewith, an arm pivoted on said lever, said reel shaft having a sliding bearing on said arm, and mechanism interposed between said arm and said lever and standard for maintaining said arm in a substantially horizontal position during the tilting movement of said lever.

2. The combination, with a harvester deck, of a reel shaft, a support for the stubbleward end of said shaft, means for adjusting said support to shift said reel, a standard mounted at the grainward end of said deck, a lever pivoted on said standard and connected with said reel shaft support for movement therewith, an arm pivoted on said lever, the grainward end of said reel shaft having a sliding bearing on said arm, a toothed rack mounted on said arm on the opposite side of its pivot from said bearing, a second toothed rack secured to said standard, and a gear wheel mounted on said lever between said racks and meshing with the teeth thereof.

3. A support for the grainward end of a harvester reel comprising a lever an arm pivoted thereon and whereon the end of the reel is mounted to slide, said lever being mounted for raising and lowering said arm to impart a corresponding movement to said reel, and means for holding said arm in a substantially horizontal position during its vertical movement.

4. A support for the grainward end of a harvester reel comprising an arm having a bearing for the reel, said arm and reel being relatively movable for fore and aft adjustment of the reel, a lever whereon said arm is pivoted, a toothed rack mounted on said arm, a fixed rack, and a gear wheel mounted on said lever and meshing with the teeth of said racks.

5. A support for the grainward end of a harvester reel comprising a lever an arm pivoted thereon, a reel shaft having a bearing on said arm and relatively movable for fore and aft adjustment of the reel, said lever being mounted for raising and lowering said arm and reel, and means for maintaining said arm in a substantially horizontal position during the raising and lowering thereof.

In witness whereof, I have hereunto set my hand this 19th day of May 1915.

JOHN H. DOWNING.

Copies of this patent may be obtained for five cents each, by addressing the "Commissioner of Patents, Washington, D. C."